United States Patent
Zemach et al.

(12)

(10) Patent No.: US 12,081,321 B2
(45) Date of Patent: Sep. 3, 2024

(54) CENTRALIZED CONTROL OF TIME GATES FOR TIME SENSITIVE NETWORKING (TSN)

(71) Applicant: Marvell Israel (M.I.S.L) Ltd., Yokneam (IL)

(72) Inventors: Rami Zemach, Givat Shapira (IL); Ziv Zamsky, Raanana (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 286 days.

(21) Appl. No.: 17/584,002

(22) Filed: Jan. 25, 2022

(65) Prior Publication Data

US 2022/0239397 A1  Jul. 28, 2022

Related U.S. Application Data

(60) Provisional application No. 63/141,446, filed on Jan. 25, 2021.

(51) Int. Cl.
*H04J 3/06* (2006.01)

(52) U.S. Cl.
CPC .................................... *H04J 3/06* (2013.01)

(58) Field of Classification Search
CPC ....... H04L 47/28; H04L 47/27; H04L 47/564; H04L 47/6215; H04L 47/6275; H04L 47/24; H04L 47/32; H04J 3/06
See application file for complete search history.

(56) References Cited

U.S. PATENT DOCUMENTS

| | | | |
|---|---|---|---|
| 9,882,823 B2 | 1/2018 | Pannell | |
| 9,960,872 B2 | 5/2018 | Pannell | |
| 10,044,524 B1 | 8/2018 | Edelhaus et al. | |
| 11,044,296 B1 | 6/2021 | Edelhaus et al. | |
| 2018/0302331 A1* | 10/2018 | Bush | H04L 47/28 |
| 2018/0316592 A1* | 11/2018 | Ellegaard | H04L 43/50 |
| 2019/0121781 A1* | 4/2019 | Kasichainula | G06F 15/17331 |
| 2019/0166061 A1 | 5/2019 | Farkas et al. | |
| 2020/0028791 A1* | 1/2020 | McGrath | H04L 41/145 |
| 2020/0169972 A1* | 5/2020 | Marce | H04L 47/283 |
| 2020/0304429 A1* | 9/2020 | Marcé | H04L 49/3018 |
| 2021/0097019 A1* | 4/2021 | Kasichainula | H04L 12/4645 |
| 2021/0149603 A1* | 5/2021 | Kobayashi | G06F 9/45558 |
| 2021/0152635 A1* | 5/2021 | Kobayashi | H04L 49/70 |
| 2022/0237009 A1* | 7/2022 | Kobayashi | G06F 9/45558 |

OTHER PUBLICATIONS

International Search Report and Written Opinion for Application No. PCT/IB2022/050654, mailed on Apr. 20, 2022 (14 pages).

* cited by examiner

*Primary Examiner* — Wutchung Chu

(57) ABSTRACT

Schedules that indicate when time gates of a network device are to permit transfer of packet data are stored in a memory. Control circuitry repeatedly identifies initial positions in the schedules corresponding to times when the schedules are accessed in a background procedure. The control circuitry uses the identified initial positions to identify updated positions in the schedules that correspond to events when control of the time gates is needed, and uses scheduling information at the updated positions in the schedules to selectively transfer packet data to components of the network device using the time gates.

23 Claims, 6 Drawing Sheets

CENTRALIZED CONTROL OF TIME GATES FOR TIME SENSITIVE NETWORKING (TSN)

CROSS REFERENCES TO RELATED APPLICATIONS

This application claims the benefit of U.S. Provisional Patent Application No. 63/141,446, entitled "Serializing Time Gates Decisions for Time Sensitive Networks (TSN)," filed on Jan. 25, 2021, which is incorporated herein by reference in its entirety for all purposes.

FIELD OF TECHNOLOGY

The present disclosure relates generally to network communications, and more particularly to network devices that implement time-sensitive networking (TSN).

BACKGROUND

Time-sensitive networking (TSN) refers to a set of standards, under development by a working group of the Institute of Electrical and Electronics Engineers (IEEE), that provide mechanisms for time-sensitive transmission of data over Ethernet communication networks. TSN provides three basic categories of mechanisms for providing real-time communications over Ethernet communication networks: i) time synchronization among network devices; ii) scheduling and traffic shaping; and iii) selection of communication paths, reservation of transmission bandwidth, and fault-tolerance.

In connection with scheduling and traffic shaping, TSN utilizes time slots that can be allocated amongst packets having different priorities. A network device can schedule packets of a particular priority level for delivery in a particular time slot that is reserved for the packets having the particular priority level, thus providing guaranteed delivery of those packets, as opposed to best-effort delivery of conventional traffic.

To facilitate scheduling and traffic shaping of TSN, network devices utilize time gates that operate according to time schedules help to control which packet(s) is/are transmitted by a port of the network device during a particular time slot. As an example, the network device may include multiple queues that store indicators of packets that are ready for transmission via a port, where the multiple queues correspond to respective priority levels. Respective time gates control when particular queues can output packet indicators, thus controlling when packets of particular priority levels are transmitted by the port.

Each time gate in a network device is associated with a respective time schedule, which may be stored in a list or table. The list or table specifies time periods when the time gate is open (e.g., when the time gate permits packet indicators stored in a queue to be output from the queue) and when the time gate is closed (e.g., when the time gate does not permit packet indicators stored in the queue to be output from the queue).

Each port of a network device typically includes multiple queues for storing packet indicators corresponding to respective priority levels. For network devices implementing TSN, a respective time gate is typically associated with each queue to control when packet indicators can be output from the queue. Some network devices such as switches and routers include a significant number of ports, each having multiple queues. Thus, some network devices implementing TSN include a significant number of time gates, each associated with a respective list/table storing time schedule information for the time gate.

SUMMARY

In an embodiment, a network device comprises: a plurality of time gates configured to control transfer of packet data within the network device; a memory configured to store schedules that indicate when time gates are to permit transfer of packet data; and control circuitry configured to: use a clock to repeatedly identify initial positions in the schedules, the initial positions corresponding to times when the schedules are accessed in a background procedure, use the identified initial positions to identify updated positions in the schedules that correspond to events when control of the time gates is needed, and use scheduling information in the schedule at the updated positions to control time gates to selectively transfer packet data to components of the network device. In another embodiment, a method for controlling information transfer within a network device includes: storing schedules in a memory, the schedules indicating when time gates are to permit transfer of packet data; repeatedly identifying, by control circuitry, initial positions in the schedules corresponding to times when the schedules are accessed in a background procedure; using, by the control circuitry, the identified initial positions to identify updated positions in the schedules that correspond to events when control of the time gates is needed; and using, by the control circuitry, scheduling information at the updated positions in the schedules to selectively transfer packet data to components of the network device using the time gates.

DETAILED DESCRIPTION

As discussed above, a network device implementing time sensitive networking (TSN) may include a significant number of time gates, each associated with a respective list/table storing time schedule information for the time gate. In aggregate, individual logic circuitry controlling respective time gates consumes a significant amount of integrated circuit (IC) chip area and consumes a significant amount of power.

In embodiments described below, a network device includes scheduling circuitry that controls a plurality of time gates, e.g., controls when each time gate permits transfer of packet data. In at least some embodiments, because the scheduling circuitry controls the plurality of time gates, circuit complexity, IC chip area, and/or power consumption needed for control of the plurality of time gates is reduced as compared to a typical network device that uses multiple instances of individual control circuitry that each individually control a single time gate.

In embodiments described below, the scheduling circuitry includes first control circuitry configured to perform a background operation that monitors a current time and repeatedly identifies respective initial positions within respective scheduling tables using the current time, the respective scheduling tables corresponding to respective time gates. The scheduling tables include respective scheduling information that indicates when respective time gates are to permit transfer of packet data.

Because the initial positions identified by the first control circuitry are identified relatively infrequently as part of a background operation, the initial positions within respective scheduling tables generally are not accurate enough to use directly to control the time gates, according to some embodiments. Thus, in some embodiments, the scheduling circuitry also includes second control circuitry configured to, in response to events that correspond to event times at which decisions regarding control of the time gates are to be made, use the respective initial positions to identify respective updated positions in respective scheduling tables, the updated positions corresponding to respective event times. Examples of events that trigger operation of the second control circuitry include: i) packet data being stored in a queue that is coupled to a time gate, ii) packet data arriving at a time gate, etc. The second control circuitry is also configured to use the respective updated positions in respective scheduling tables to generate control signals that control the respective time gates to control when each time gate permits transfer of packet data.

Figure 1:
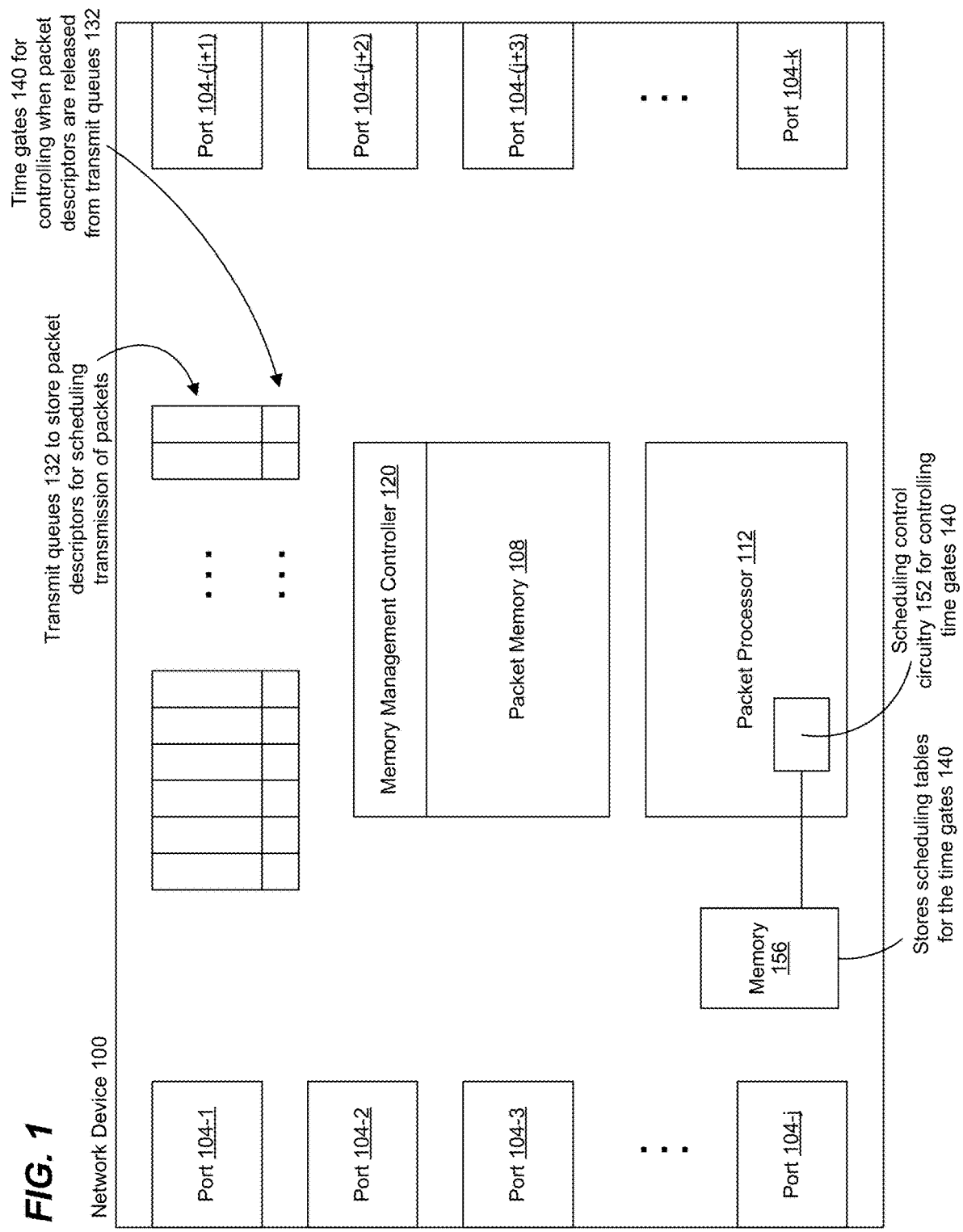
FIG. 1 is a simplified diagram of an example network device in which a plurality of time gates is centrally controlled, according to an embodiment.

FIG. 1 is a simplified diagram of an example network device 100, according to an embodiment. The network device 100 includes a plurality of ports 104, a packet memory 108, and a packet processor 112. At least some of the ports 104 are configured to communicatively couple to respective communication links. Packets received via communication links coupled to ports 104 are temporarily stored in the packet memory 108 while the packet processor 112 processes at least headers of the packets to determine ports 104 via which the packets are to be transmitted. Components of the network device 100, such as the ports 104, access the packet memory 108 via a memory management controller 120.

In some embodiments, the packet memory 108 is a part of a larger memory device that stores information used by the network device 100 in addition to the information stored in the packet memory 108. Examples of information stored in the larger memory device in addition to the information stored in the packet memory 108 are described below. In other embodiments, the packet memory 108 corresponds to a first memory device, and information used by the network device 100 in addition to the packet memory 108 is stored in one or more second memory devices that are distinct from the first memory device. In some embodiments, the packet memory 108 corresponds to multiple memory devices.

When a packet is received via one of the ports 104, the memory management controller 120 allocates memory resources in the packet memory 108 for storing the packet. Additionally, the memory management controller 120 generates a packet descriptor corresponding to the packet and provides the packet descriptor to the packet processor 112 for processing by the packet processor 112. Packet descriptors and processing of packet descriptors by the packet processor 112 will be discussed in more detail below. A received packet (or at least a data portion of the receive packet) is stored in the packet memory 108 using memory resources allocated by the memory management controller 120. In some embodiments, the memory management controller 120 includes write direct memory access (DMA) circuitry (not shown) that writes packet data received from a port 104 to the packet memory 108.

As discussed above, the memory management controller 120 generates packet descriptors corresponding to respective received packets. The packet descriptor includes header information extracted from the packet by the memory management controller 120, such as Layer-2 header information, Layer-3 header information, tunnelling header information, etc. The packet descriptor also includes information that is associated with the packet but that is not included within any headers of the packet when the packet is received by the network device 100 and is not included within any headers of the packet when the packet is transmitted by the network device 100 (referred to herein as "associated packet information"). Examples of associated packet information that may be included in the packet descriptor by the memory management controller 120 include an indication of a location in the packet memory 108 at which the packet is stored, an identifier (ID) of the port 104 via which the packet was received ("source port ID"), an indicator of a time at which the packet was received by the network device 100 ("receive time indicator"), etc. Additionally, the packet processor 112, when processing the packet descriptor, may add associated packet information to the packet descriptor such as an indicator of one or more ports 104 via which the packet is to be transmitted ("target ports"), an indicator of a priority level according to which the packet is to be transmitted by the target port(s), an indicator of whether the packet is to be dropped, an indicator of whether a tunneling header is to be added to the packet, an indicator of whether a tunneling header is to be removed from the packet, an indicator of whether a timestamp is to be added to the packet prior to transmitting the packet, etc.

In some embodiments, the packet processor 112 comprises a Layer-2 bridge engine configured to process at least Layer-2 headers (e.g., media access control (MAC) headers) of packets received via the ports 104 to determine ports 104 via which the packets are to be transmitted. In embodiments in which the packet processor 112 comprises a Layer-2 bridge engine, the Layer-2 bridge engine uses at least Layer-2 header information in a packet descriptor to determine one or more target ports via which a packet corresponding to the packet descriptor is to be transmitted and stores indicator(s) of the determined target ports in the packet descriptor. In some embodiments in which the packet processor 112 comprises a Layer-2 bridge engine, the Layer-2 bridge engine utilizes a forwarding table that stores associations between i) at least Layer-2 information (e.g., destination MAC addresses, VLAN identifiers (VIDs), etc.) and ii) ports 104 to determine one or more target ports via which a packet corresponding to the packet descriptor is to be transmitted. In some embodiments, the forwarding table is stored in one or more memory devices that are distinct from one or more other memory devices corresponding to the packet memory 108. In other embodiments, the forwarding table is stored in one or more memory devices corresponding to the packet memory 108.

In some embodiments, the packet processor 112 additionally or alternatively comprises a Layer-3 routing engine configured to process at least Layer-3 headers (e.g., Internet Protocol (IP) headers) of packets received via the ports 104 to determine ports 104 via which the packets are to be transmitted. In embodiments in which the packet processor 112 comprises a Layer-3 routing engine, the Layer-3 routing engine uses IP header information in a packet descriptor to determine a next hop IP address to be included in a packet corresponding to the packet descriptor, and determines one or more target ports via which the packet is to be transmitted. Additionally, the Layer 3 routing engine stores the next hop IP address and indicator(s) of the determined target ports in the packet descriptor. In some embodiments in which the packet processor 112 comprises a Layer-3 routing engine, the Layer-3 routing engine utilizes a forwarding table that stores Layer-3 forwarding information and associations with ports 104 to determine a next hop IP address and one or more target ports via which a packet corresponding to the packet descriptor is to be transmitted. In some embodiments, the forwarding table is stored in one or more memory devices that are distinct from one or more other memory devices corresponding to the packet memory 108. In other embodiments, the forwarding table is stored in one or more memory devices corresponding to the packet memory 108.

When the packet processor 112 completes processing of a packet descriptor, the packet descriptor is stored in one or more transmit queues 132 corresponding to one or target ports 104 that the packet processor 112 determined and via which the packet is to be transmitted. After a packet descriptor reaches a head of a transmit queue 132, the packet descriptor is released to the memory management controller 120. The memory management controller 120 uses information stored in the packet descriptor (e.g., an indication of a location in the packet memory 108 at which a packet corresponding to the packet descriptor is stored) to retrieve the packet from the memory 108, and provides the retrieved packet data to the port 104 that corresponds to the transmit queue 132 for transmission of the packet via the communication link coupled to the port 104. In some embodiments, the memory management controller 120 includes read DMA circuitry (not shown) that reads packet data from the packet memory 108 and provides the packet data to a port 104 for transmission.

When a packet is retrieved from the packet memory 108 for transmission, the memory management controller 120 designates the memory resources used for storing the packet as "unused", i.e., the memory management controller 120 returns the memory resources to a pool of unused memory resources that are available for allocation for storing newly received packets or other information, for example.

In some embodiments, a respective set of multiple transmit queues 132 corresponds to each of at least some of the ports 104. For example, respective transmit queues 132 in a set of multiple transmit queues 132 correspond to respective transmit priorities, according to some embodiments.

The network device also comprises time gates 140 coupled to respective transmit queues 132 among the plurality of transmit queues 132. Each time gate 140 controls whether packet data in the respective transmit queue 132 is released to cause transmission of a corresponding packet by a corresponding port 104. In some embodiments, at most one time gate 140 corresponding to a port 104 is open (e.g., allowing release of packet data) at any given time, thus permitting allocation of time slots for transmission of packets only corresponding to a respective priority level.

Figure 2:
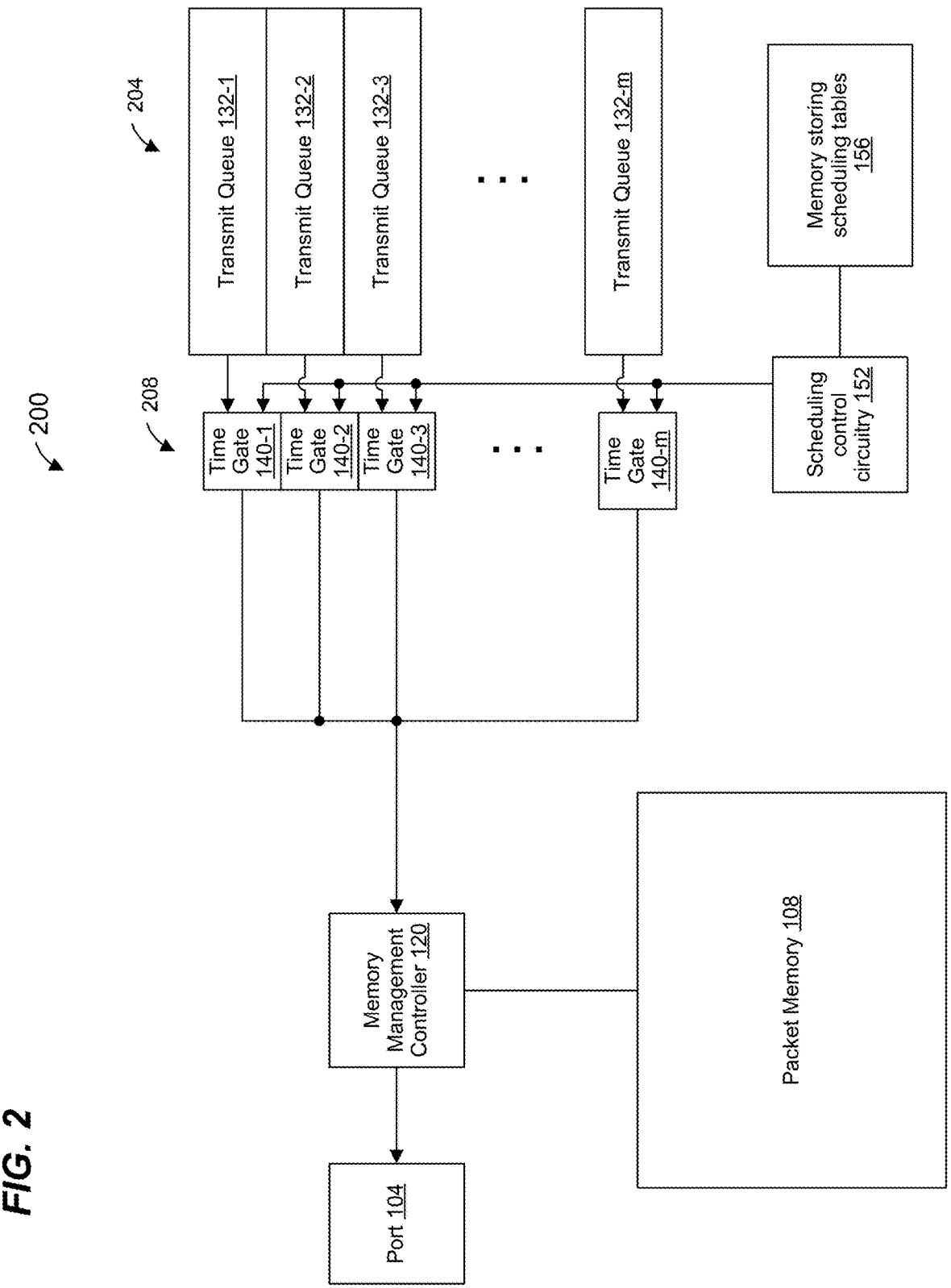
FIG. 2 is a simplified block diagram of a portion of the network device of FIG. 1 that illustrates centralized control circuitry controlling a plurality of time gates, according to an embodiment.

FIG. 2 is a simplified block diagram illustrating a portion 200 of the network device 100, the portion 200 comprising a set 204 of transmit queues 132 and a set 208 of time gates 140 corresponding to a particular port 104, according to an embodiment. In an embodiment, each transmit queue 132 corresponds to a respective transmit priority.

Each time gate 140 controls when packet data from a corresponding transmit queue 132 is permitted to be transferred to the memory management controller 120. In some embodiments, at most one time gate 140 is open (e.g., allowing transfer of packet data from the transmit queue 132 to the memory management controller 120) at any given time, thus permitting allocation of respective time slots for transmission of packets by the port 104 only corresponding to a respective priority level.

Referring now to FIGS. 1 and 2, the packet processor 112 includes scheduling control circuitry 152 that is configured to control the time gates 140 using scheduling information stored in a memory 156. In other embodiments, the scheduling control circuitry 152 is distinct from the packet processor 112.

Figure 3:
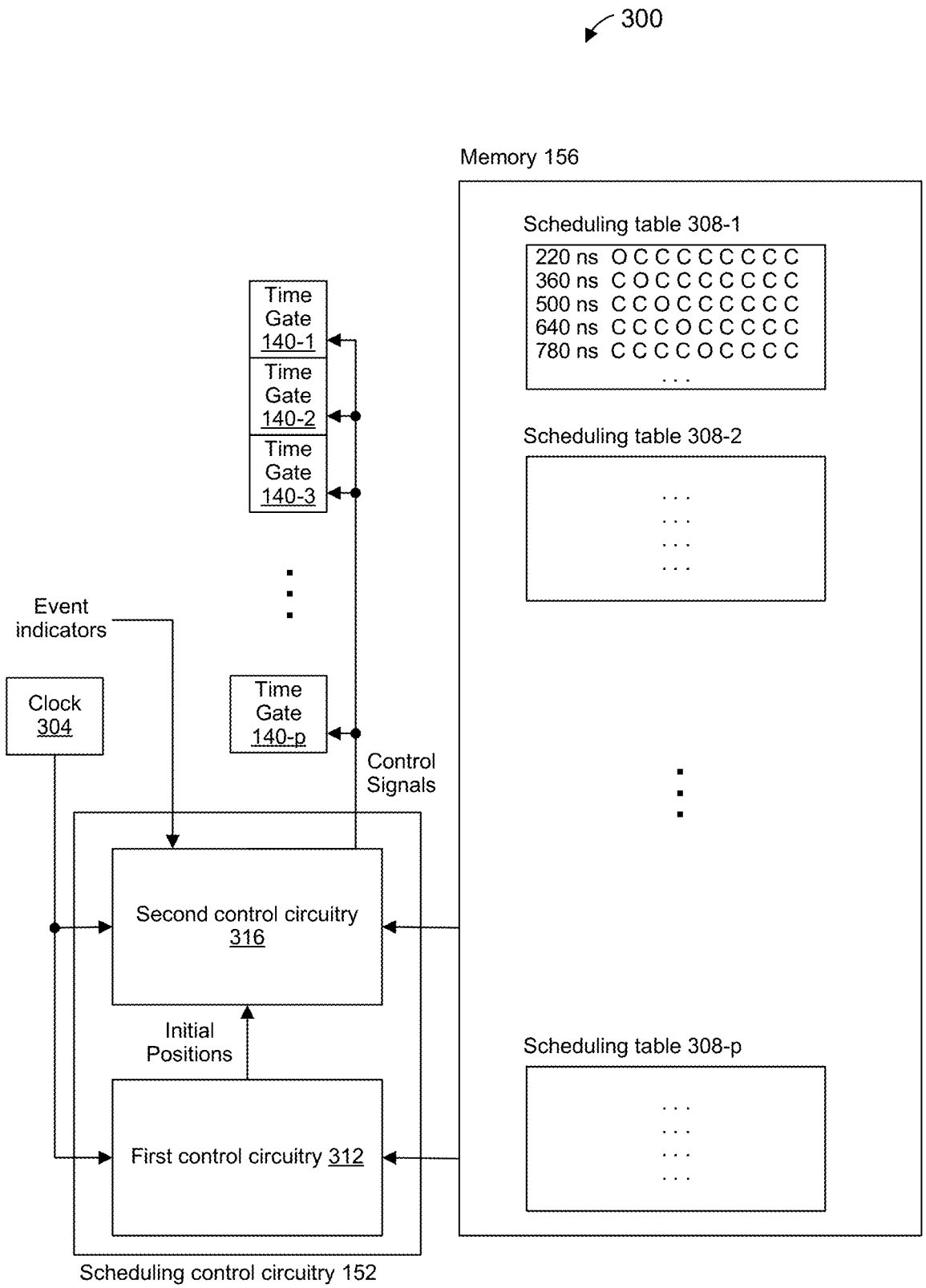
FIG. 3 is a simplified diagram of example control circuitry controlling a plurality of time gates, according to an embodiment.

FIG. 3 is a simplified block diagram illustrating a portion 300 of the network device 100, the portion 300 comprising a plurality of time gates 140, the scheduling control circuitry 152, the memory 156, and a clock 304, according to an embodiment.

The memory 156 stores scheduling tables 308 corresponding to respective time gates 140. For example, scheduling table 308-1 corresponds to time gate 140-1, scheduling table 308-2 corresponds to time gate 140-2, and so on, according to an embodiment. Each scheduling table 308 stores time schedule information that indicates times when the corresponding time gate 140 is to permit transfer of packet data. In some embodiments, each of at least some of the scheduling tables 208 stores time schedule information that indicates times when the corresponding time gate 140 is not to permit transfer of packet data. FIG. 3 depicts the scheduling table 308-1 as including C's and O's, where the C's indicate times when the corresponding time gate 140 is not to permit transfer of packet data and where the O's indicate times when the corresponding time gate 140 is to permit transfer of packet data.

The scheduling control circuitry 152 is configured to use i) a current time generated by the clock 304 and ii) time schedule information in the scheduling tables 308 to generate control signals that control when each time gate 140 permits transfer of packet data. For example, scheduling control circuitry 152 is configured to determine a location, corresponding to a current time, in each table 308, and use information at the determined location in the table 308 to determine whether the corresponding time gate 140 is to permit transfer of packet data at the current time, according to some embodiments.

The scheduling control circuitry 152 comprises first control circuitry 312 that is configured to perform a background operation that monitors the current time and repeatedly identifies respective initial positions within the scheduling tables 308 corresponding to the current time. Because the initial positions identified by the first control circuitry 312 are identified relatively infrequently as part of a background operation, the initial positions within respective scheduling tables generally are not accurate enough to use directly to control the time gates 140, according to some embodiments.

The scheduling control circuitry 152 also includes second control circuitry 316 configured to receive indications of events that correspond to event times at which decisions regarding control of the time gates 140 are to be made, and to receive the initial positions determined by the first control circuitry 312. Examples of events that correspond to event times at which decisions regarding control of the time gates 140 are to be made include: i) packet data being stored in a transmit queue 132, ii) packet data arriving at a time gate 140, etc.

The second control circuitry 316 is also configured to monitor the current time and use the respective initial positions determined by the first control circuitry 312 to identify respective updated positions in respective scheduling tables 308, the updated positions corresponding to respective event times. The second control circuitry 316 is further configured to use the respective updated positions in respective scheduling tables to generate control signals that control the respective time gates to control when each time gate permits transfer of packet data.

Because the second control circuitry 316 is provided the initial position (which was identified by the first control circuitry) within the scheduling table 308, the second control circuitry 316 is typically able to identify an updated position corresponding to the event time more quickly as opposed to if the second control circuitry 316 had started a search for the position from a beginning of the scheduling table 308, for example.

Referring again to FIGS. 1 and 2, the time gates 140 control whether packet descriptors are released from the queues 132. In some embodiments, time gates additionally or alternatively are included in the packet processor 112 to control the transfer of packet descriptors between different components of the packet processor 112.

Figure 4:
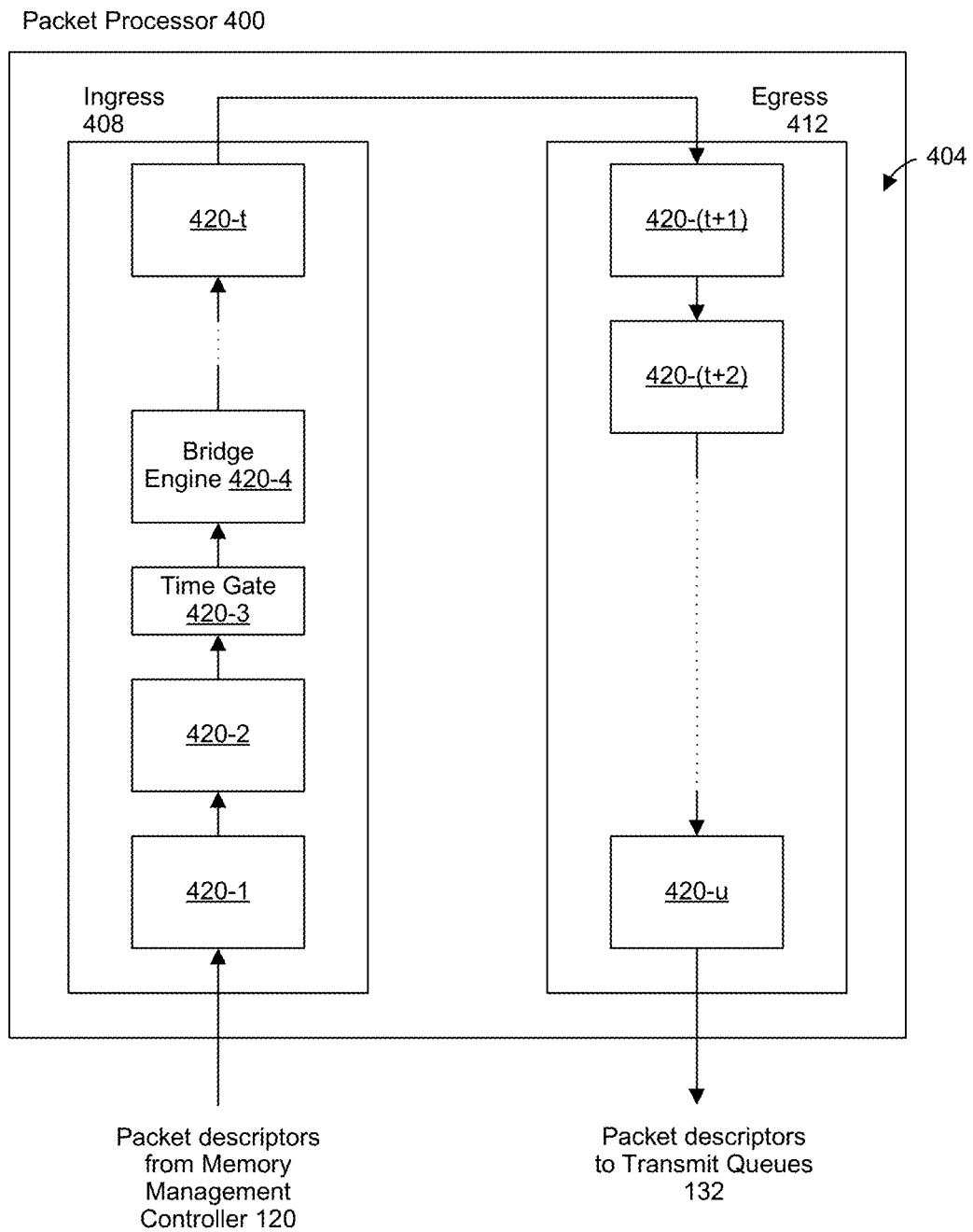
FIG. 4 is a simplified diagram of an example packet processing pipeline that includes time gate circuitry, according to another embodiment.

FIG. 4 is a diagram of an example packet processor 400 that includes one or more time gates control the transfer of packet descriptors between different components of the packet processor 400, according to an embodiment. In an embodiment, the packet processor 400 is utilized as the packet processor 112 of FIGS. 1 and 2, and FIG. 4 is described with reference to FIGS. 1 and 2 for ease of explanation. In other embodiments, the packet processor 112 of FIGS. 1 and 2 has a suitable architecture different than the packet processor 400. In some embodiments, the packet processor 400 is utilized in a suitable network device different than the network device 100 of FIG. 1.

The packet processor 400 includes a packet processing pipeline 404 that includes an ingress portion 408 and an egress portion 412. The ingress portion 408 receives packet descriptors (e.g., from the memory management controller 12) and performs ingress operations for packets corresponding to the packet descriptors, such as one or more of i) making a forwarding decision (e.g., determining one or more ports 104 via which a packet is to be transmitted, determining a next hop forwarding address, etc.), ii) tunnel termination, iii) ingress policing, etc. The egress portion 412 performs egress operations for packets corresponding to the packet descriptors, such as one or more of i) modifying headers of packets, ii) replicating packet descriptors for packets that are to be transmitted via multiple ports 104, iii) egress policing, etc.

Packet descriptors output by the packet processing pipeline 404 are provided to transmit queues 132.

The packet processing pipeline 404 includes a plurality of pipeline hardware units 420 arranged in a pipeline to process packet descriptors. As an illustrative example, the ingress portion 408 includes a Layer-2 bridge engine 420-4 that is configured to process at least Layer-2 headers (e.g., MAC headers) of packets received via the ports 104 to determine ports 104 via which the packets are to be transmitted. In embodiments in which the packet processor 400 comprises the Layer-2 bridge engine 420-4, the Layer-2 bridge engine 420-4 uses at least Layer-2 header information in a packet descriptor to determine one or more target ports via which a packet corresponding to the packet descriptor is to be transmitted and stores indicator(s) of the determined target ports in the packet descriptor. In some embodiments in which the packet processor 400 comprises a Layer-2 bridge engine, the Layer-2 bridge engine utilizes a forwarding table (not shown) that stores associations between i) at least Layer-2 information (e.g., destination MAC addresses, VIDs, etc.) and ii) ports 104 to determine one or more target ports via which a packet corresponding to the packet descriptor is to be transmitted. In some embodiments, the forwarding table is stored in one or more memory devices that are distinct from one or more other memory devices corresponding to the packet memory 108. In other embodiments, the forwarding table is stored in one or more memory devices corresponding to the packet memory 108.

The ingress portion 408 also includes a time gate unit 420-3 that is configured to process packet descriptors using scheduling information in scheduling tables (not shown in FIG. 4) that correspond to different priority levels (and optionally different ports 104 at which packets (corresponding to packet descriptors being processed by the time gate unit 420-3) are received). Generally, each scheduling table indicates time periods allocated for transmission of packets having a respective priority level. When a packet descriptor is received by the time gate unit 420-3, the time gate unit 420-3 examines a scheduling table corresponding to a priority level of the packet (and optionally corresponding to a port 104 at which the packet was received) to determine if the current time (or a time when the packet was received by the network device) is within a time period allocated for transmission of packets having the priority level of the packet. In response to determining that the current time (or a time when the packet was received by the network device) is within a time period allocated for transmission of packets having the priority level of the packet, the time gate unit 420-3 passes the packet descriptor unchanged to a next unit in the pipeline 404. On the other hand, in response to determining that the current time (or a time when the packet was received by the network device) is not within a time period allocated for transmission of packets having the priority level of the packet, the time gate unit 420-3 discards the packet descriptor, or modifies the packet descriptor to indicate that the packet is to be dropped and then passes the descriptor to the next unit in the pipeline 404, according to some embodiments. Modification of the packet descriptor to indicate that the packet is to be dropped causes a subsequent hardware unit in the pipeline unit 404 to discard the packet descriptor. Discarding of the packet descriptor prevents the packet descriptor from being sent to any of the transmit queues 132, and the packet is dropped by the network device 100.

In other embodiments, in response to determining that the packet is not permitted to be received, the time gate unit 420-3 modifies the packet descriptor to change a priority level of the packet and then passes the descriptor to the next unit in the pipeline 404, according to some embodiments. Modification of the packet descriptor to change a priority level of the packet causes i) a subsequent hardware unit in the pipeline unit 404 to modify a header of the packet to indicate the new priority level, and ii) prevents the packet descriptor from being sent to a transmit queue 132 corresponding to the original priority level of the packet. Rather, the packet descriptor will be sent to a different transmit queue 132 corresponding to the new priority level of the packet.

Figure 5:
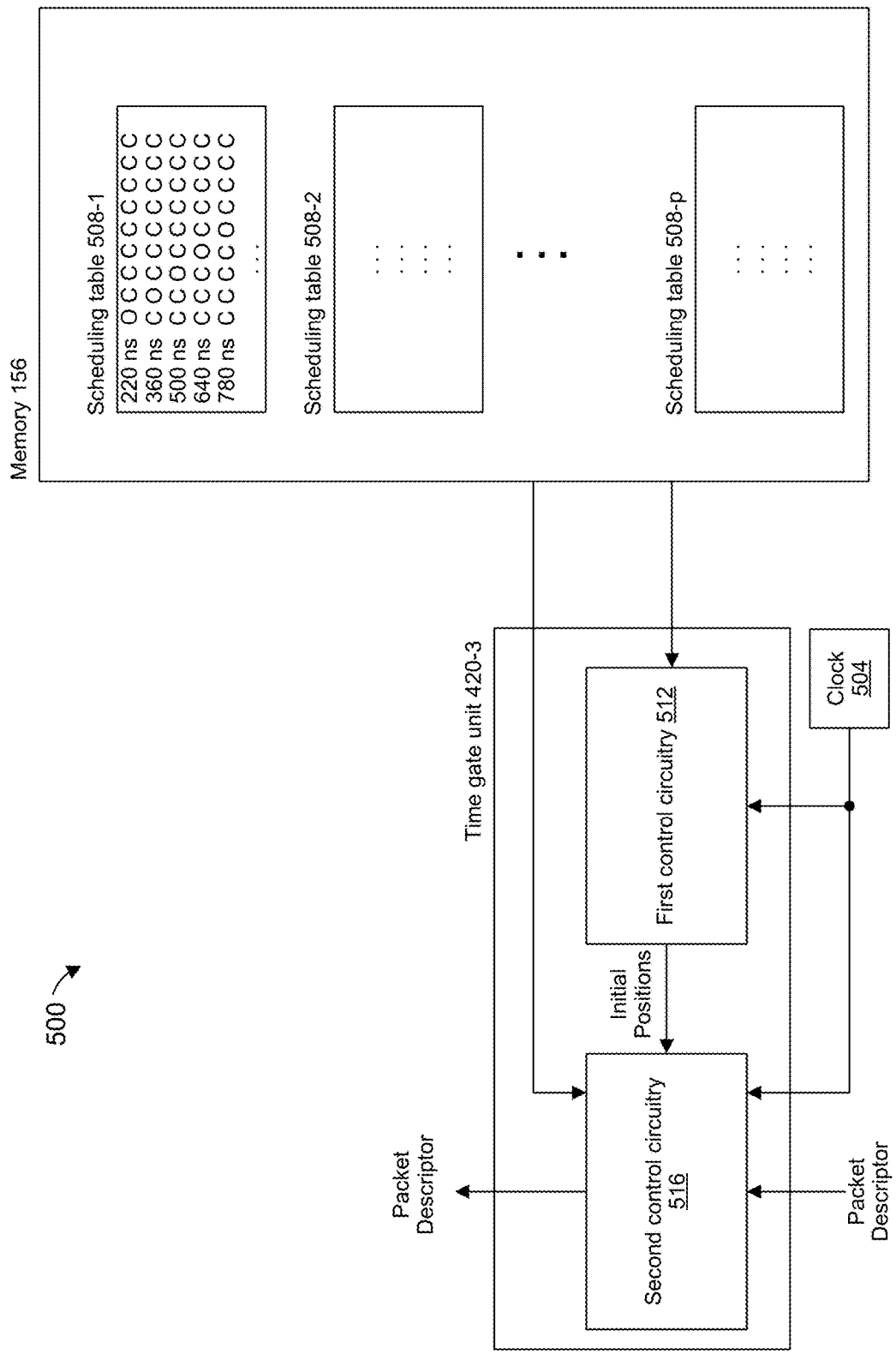
FIG. 5 is a simplified diagram of the time gate circuitry of FIG. 4, according to another embodiment.

FIG. 5 is a simplified block diagram illustrating the time gate unit 420-3 of FIG. 4 within a portion 500 of a network device, according to an embodiment. In some embodiments, the packet processor 400 (FIG. 4) and the portion 500 are included in the network device 100 of FIG. 1, and FIG. 5 is described with reference to FIG. 1 for ease of explanation. In other embodiments, the packet processor 400 (FIG. 4) and the portion 500 are included in a suitable network device different than the network device 100 of FIG. 1. In some embodiments, the network device 100 of FIG. 1 does not include the packet processor 400 (FIG. 4) nor the portion 500.

The portion 500 also comprises the memory 156 and a clock 504. The memory 156 stores scheduling tables 508 that correspond to different priority levels (and optionally different ports 104 at which packets (corresponding to packet descriptors being processed by the time gate unit 420-3) are received). Generally, each scheduling table 508 indicates when a packet having a respective priority level is permitted to be received by the network device. When a packet descriptor is received by the time gate unit 420-3, the time gate unit 420-3 examines a scheduling table 508 corresponding to a priority level of the packet (and optionally corresponding to a port 104 at which the packet was received) to determine if the packet is permitted to be received at the current time (or was permitted to be received when the packet was received by the network device). In response to determining that the packet is permitted to be received, the time gate unit 420-3 passes the packet descriptor unchanged to a next unit in the pipeline 404. On the other hand, in response to determining that the packet is not permitted to be received, the time gate unit 420-3 discards the packet descriptor, or modifies the packet descriptor to indicate that the packet is to be dropped and then passes the descriptor to the next unit in the pipeline 404, according to some embodiments. Modification of the packet descriptor to indicate that the packet is to be dropped causes a subsequent hardware unit in the pipeline unit 404 to discard the packet descriptor. Discarding of the packet descriptor prevents the packet descriptor from being sent to any of the transmit queues 132, and the packet is dropped by the network device 100.

Each scheduling table 508 stores time schedule information that indicates times when packets having the priority level corresponding to the scheduling table 508 are permitted to be received. In some embodiments, each of at least some of the scheduling tables 508 stores time schedule information that indicates times when packets having the priority level corresponding to the scheduling table 508 are not permitted to be received. FIG. 5 depicts the scheduling table 508-1 as including C's and O's, where the C's indicate times when packets are not permitted to be received and where the O's indicate times when the packets are permitted to be received.

The time gate unit 420-3 is configured to use i) a current time generated by the clock 504 (or a time indicator in the descriptor that indicates when the packet was received by the network device, in some embodiments) and ii) time schedule information in the scheduling tables 508 to selectively pass a packet descriptor unchanged to a next pipeline unit 420. In some embodiments, the time gate unit 420-3 is also configured to use i) the current time generated by the clock 504 (or the time indicator in the descriptor that indicates when the packet was received by the network device, in some embodiments) and ii) time schedule information in the scheduling tables 508 to selectively mark the packet descriptor to indicate the packet should be dropped and then pass the packet descriptor to the next pipeline unit 420. In some embodiments, the time gate unit 420-3 is also configured to use i) the current time generated by the clock 504 (or the time indicator in the descriptor that indicates when the packet was received by the network device, in some embodiments) and ii) time schedule information in the scheduling tables 508 to selectively change a priority level value in the packet descriptor to indicate the priority level of the packet should be changed to a different value and then pass the packet descriptor to the next pipeline unit 420. For example, the time gate unit 420-3 is configured to determine a location, corresponding to a current time (or to the time indicator in the descriptor that indicates when the packet was received by the network device, in some embodiments), in each table 508, and use information at the determined location in the table 508 to determine whether the packet descriptor should be passed unchanged to the next pipeline unit 420 and whether the packet descriptor should be modified as discussed above and then passed to the next pipeline unit 420, according to some embodiments.

The time gate unit 420-3 comprises first control circuitry 512 that is configured to perform a background operation that monitors the current time and repeatedly identifies respective initial positions within the scheduling tables 508 corresponding to the current time. Because the initial positions identified by the first control circuitry 512 are identified relatively infrequently as part of a background operation, the initial positions within respective scheduling tables generally are not accurate enough to use directly to the time gate unit 420-3, according to some embodiments.

The time gate unit 420-3 also includes second control circuitry 516 configured to receive packet descriptors from a previous pipeline unit 420, and to receive the initial positions determined by the first control circuitry 512.

The second control circuitry 516 is also configured to monitor the current time and use the respective initial positions determined by the first control circuitry 512 to identify respective updated positions in respective scheduling tables 508, the updated positions corresponding to event times at which packet descriptors are received, according to an embodiment. In another embodiment, the second control circuitry 516 is configured to use i) time indicators in packet descriptors that indicate respective times at which corresponding packets were received by the network device 100, and ii) the respective initial positions determined by the first control circuitry 512 to identify respective updated positions in respective scheduling tables 508, the updated positions corresponding to event times at which packets corresponding to the packet descriptors were received by the network device 100.

The second control circuitry 516 is further configured to use the respective updated positions in respective scheduling tables to determine i) whether a packet descriptor should be passed unchanged to a next pipeline unit 420, and one of ii-a) whether to mark the packet descriptor to indicate the packet should be dropped and then pass the packet descriptor to the next pipeline unit 420, and ii-b) whether to change a priority level value in the packet descriptor to indicate the priority level of the packet should be changed to a different value and then pass the packet descriptor to the next pipeline unit 420.

Because the second control circuitry 516 is provided the initial position (which was identified by the first control circuitry 512) within the scheduling table 508, the second control circuitry 516 is typically able to identify an updated position corresponding to the event time more quickly as opposed to if the second control circuitry 516 had started a search for the position from a beginning of the scheduling table 508, for example.

Figure 6:
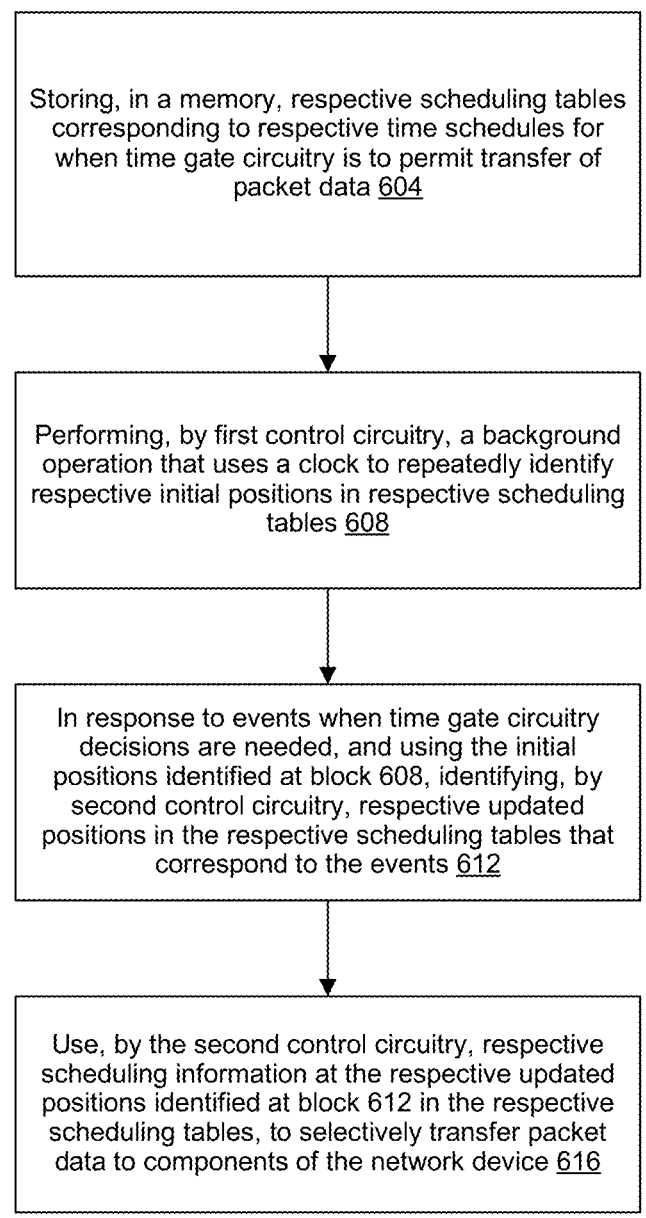
FIG. 6 is a flow diagram of an example method for controlling information transfer within a network device using centrally controlled time gates, according to an embodiment.

FIG. 6 is a flow diagram of an example method 600 for controlling information transfer within a network device, according to an embodiment. In various embodiments, the method 600 is implemented by one or more of the network devices and components described with reference to one or more of FIGS. 1-5. FIG. 6 is described with reference to FIGS. 1-5 for ease of explanation. In other embodiments, the method 600 is implemented by a suitable network device different than the network devices/components described with reference to FIGS. 1-5.

At block 604, respective scheduling tables are stored in a memory, the respective scheduling tables corresponding to respective time schedules for when gate circuitry is to permit transfer of packet data. In some embodiments, block 604 includes storing the scheduling tables 308 in the memory 156. In some embodiments, block 604 additionally or alternatively includes storing the scheduling tables 508 in the memory 156.

At block 608, first control circuitry performs a background operation that uses a clock to repeatedly identify respective initial positions in respective scheduling tables. In some embodiments, block 608 is implemented by the first control circuitry 312 (FIG. 3). In some embodiments, block 608 is additionally or alternatively implemented by the first control circuitry 512 (FIG. 5).

At block 612, in response to events when time gate circuitry decisions are needed, and using the initial positions identified at block 608, second control circuitry identifies respective updated positions in the respective scheduling tables that correspond to the events. In some embodiments, block 612 is implemented by the second control circuitry 316 (FIG. 3). In some embodiments, block 612 is additionally or alternatively implemented by the second control circuitry 516 (FIG. 5).

In some embodiments, the events of block 612 include the storing of packet data in queues coupled to time gate circuitry. For example, in some embodiments, the events of block 612 include the storing of packet descriptors in the transmit queues 132 (FIGS. 1-2). In some embodiments, the events of block 612 additionally or alternatively include the arrival of packet data at time gate circuitry. For example, in some embodiments, the events of block 612 include the arrival of packet descriptors at the time gates 140 (FIGS. 1-3). As another example, in some embodiments, the events of block 612 include the arrival of packet descriptors at the time gate unit 420-3 (FIGS. 4 and 5).

At block 616, the second control circuitry uses respective scheduling information at the respective updated positions (identified at block 612) in the respective scheduling tables to selectively transfer packet data to components of the network device. Referring to FIGS. 1-3, for example, the second control circuitry 312 generates control signals using respective scheduling information at the respective updated positions (identified at block 612) in the respective scheduling tables 308 to generate control signals that control the time gates 140 to selectively permit transfer of packet descriptors from the transmit queues 132 to the memory management controller 120. Referring to FIGS. 4 and 5, for example, the second control circuitry 516 uses respective scheduling information at the respective updated positions (identified at block 612) in the respective scheduling tables 508 to determine whether packet descriptors are forwarded unchanged to the next unit 420 in the pipeline 404, or whether packet descriptors are first modified (e.g., to indicate that packet should be dropped, to indicate a priority level of the packet should be changed, etc.) and then forwarded to the next unit 420 in the pipeline 404.

Embodiment 1: A network device, comprising: a plurality of time gates configured to control transfer of packet data within the network device; a memory configured to store schedules that indicate when time gates are to permit transfer of packet data; and control circuitry configured to: use a clock to repeatedly identify initial positions in the schedules, the initial positions corresponding to times when the schedules are accessed in a background procedure, use the identified initial positions to identify updated positions in the schedules that correspond to events when control of the time gates is needed, and use scheduling information in the schedule at the updated positions to control time gates to selectively transfer packet data to components of the network device.

Embodiment 2: The network device of embodiment 1, wherein: the memory is configured to store, for each of at least some gates among the plurality of gate circuits, a respective scheduling table corresponding to a respective time schedule of when the time gate is to permit transfer of packet data; and the control circuitry comprises: first control circuitry configured to perform a background operation that uses the clock to repeatedly identify respective initial positions in respective scheduling tables, and second control circuitry configured to control respective time gates using the respective scheduling tables, including: in response to events when decisions regarding control of time gates are needed, and using the respective identified initial positions, identifying respective updated positions in respective scheduling tables that correspond to the events, and using respective scheduling information in the respective scheduling tables at the respective updated positions to control time gates to selectively transfer packet data to components of the network device.

Embodiment 3: The network device of either of embodiments 1 or 2, further comprising: a plurality of ports configured to communicatively couple to a plurality of communication links; wherein each time gate within a set of time gates among the plurality of time gates is configured to control transfer of packet data to a corresponding port for transmission via a corresponding communication link, each time gate in the set corresponding to a respective priority level; and wherein the memory is configured to store, for each of at least some time gates among the set of time gates, a respective scheduling table corresponding to a respective time schedule of when the time gate is to permit transfer of packet data to the corresponding port.

Embodiment 4: The network device of embodiment 3, further comprising: respective sets of multiple queues coupled to the plurality of ports, each set of multiple queues configured to store packet descriptors corresponding to packets to be transmitted via the respective port, wherein respective queues in each set correspond to respective priority levels; wherein each time gate within the set of time gates is configured to control transfer of packet descriptor data from a respective queue to a memory controller to cause a packet corresponding to the packet descriptor to be sent to a port corresponding to the queue for transmission via the corresponding communication link.

Embodiment 5: The network device of embodiment 4, wherein: the control circuitry is configured to, in response to packet descriptors being stored in respective queues, identify respective updated positions in respective scheduling tables that correspond to respective times at which the packet descriptors were stored in the respective queues.

Embodiment 6: The network device of embodiment 4, wherein: the control circuitry is configured to, in response to packet descriptors arriving at respective time gates, identify respective updated positions in respective scheduling tables that correspond to respective times at which the packet descriptors arrived at the respective time gates.

Embodiment 7: The network device of either of embodiments 1 or 2, further comprising: a plurality of ports configured to communicatively couple to a plurality of communication links; and a packet processor configured to process packets received by the network device and to determine ports via which packets received by the network device are to be transmitted, the packet processor including time gate circuitry; wherein the control circuitry is configured to: in response to the time gate circuitry of the packet processor receiving packet descriptors, identify the respective updated positions in the schedules using the respective identified initial positions, and use respective scheduling information in the schedules at the respective updated positions to control the time gate circuitry to selectively modify the packet descriptors.

Embodiment 8: The network device of embodiment 7, wherein the control circuitry is configured to: in response to the time gate circuitry of the packet processor receiving packet descriptors, identify respective updated positions in the schedules that correspond to respective times at which the time gate circuitry received the respective packet descriptors.

Embodiment 9: The network device of embodiment 7, wherein the control circuitry is configured to: in response to the time gate circuitry of the packet processor receiving packet descriptors, identify respective updated positions in the schedules that correspond to respective times at which respective packets corresponding to the respective packet descriptors were received.

Embodiment 10: The network device of embodiment 7, wherein the control circuitry is configured to: use scheduling information in the schedules at the updated positions to control the time gate circuitry to selectively modify the packet descriptors to indicate selected packets are to be dropped.

Embodiment 11: The network device of embodiment 7, wherein the control circuitry is configured to: use scheduling information in the schedules at the updated positions to control the time gate circuitry to selectively modify the packet descriptors to indicate priority levels of selected packets are to be modified.

Embodiment 12: A method for controlling information transfer within a network device, the method comprising: storing schedules in a memory, the schedules indicating when time gates are to permit transfer of packet data; repeatedly identifying, by control circuitry, initial positions in the time schedules corresponding to times when the schedules are accessed in a background procedure; using, by the control circuitry, the identified initial positions to identify updated positions in the schedules that correspond to events when control of the time gates is needed; and using, by the control circuitry, scheduling information at the updated positions in the schedules to selectively transfer packet data to components of the network device using the time gates.

Embodiment 13: The method of embodiment 12, wherein: storing schedules in the memory comprises storing respective scheduling tables in the memory, the respective scheduling tables corresponding to respective time schedules for when respective time gates are to permit transfer of packet data; repeatedly identifying the initial positions in the time schedules comprises performing, by first control circuitry, the background operation to use a clock to repeatedly identify respective initial positions in respective scheduling tables, the initial positions corresponding to times when the schedules are accessed in a background procedure; using the identified initial positions to identify updated positions in the schedules comprises: in response to events when time gate circuitry decisions are needed, identifying, by second control circuitry, respective updated positions in the respective scheduling tables that correspond to the events using the initial positions; and using the scheduling information at the updated positions in the schedules to selectively transfer packet data comprises using, by the second control circuitry, respective scheduling information at the respective updated positions in the respective scheduling tables to selectively transfer packet data to components of the network device.

Embodiment 14: The method of either of embodiments 12 or 13, further comprising: storing packet descriptors corresponding to packets in a plurality of queues corresponding to a plurality of time gates; wherein using the scheduling information at the updated positions in the schedules to selectively transfer packet data comprises the control circuitry using scheduling information at the updated positions in the schedules to selectively transfer packet descriptors from the plurality of queues to a memory controller to cause packets corresponding to packet descriptors to be sent to one or more ports for transmission via the corresponding communication link.

Embodiment 15: The method of embodiment 14, wherein using the identified initial positions to identify updated positions in the schedules comprises: in response to packet descriptors being stored in respective queues, identifying, by the control circuitry, respective updated positions in the respective schedules that correspond to respective times at which the packet descriptors were stored in the respective queues.

Embodiment 16: The method of embodiment 14, wherein using the identified initial positions to identify updated positions in the schedules comprises: in response to packet descriptors arriving at respective time gates, identifying, by the control circuitry, respective updated positions in respective schedules that correspond to respective times at which the packet descriptors arrived at the respective time gates.

Embodiment 17: The method of either of embodiments 12 or 13, further comprising: processing, by a packet processor, packets received by the network device to determine ports via which packets received by the network device are to be transmitted, the packet processor including time gate circuitry; wherein using the identified initial positions to identify updated positions in the schedules comprises, in response to the time gate circuitry of the packet processor receiving packet descriptors, identifying respective updated positions in the respective schedules using respective identified initial positions; and wherein using the scheduling information at the updated positions in the schedules to selectively transfer packet data comprises using respective scheduling information in the respective schedules at the respective updated positions to control the time gate circuitry to selectively modify the packet descriptors.

Embodiment 18: The method of embodiment 17, wherein identifying respective updated positions in the respective schedules that correspond to the events comprises: in response to the time gate circuitry of the packet processor receiving packet descriptors, identifying respective updated positions in the respective schedules that correspond to respective times at which the time gate circuitry received the respective packet descriptors.

Embodiment 19: The method of embodiment 17, wherein identifying respective updated positions in the respective schedules that correspond to the events comprises: in response to the time gate circuitry of the packet processor receiving packet descriptors, identifying respective updated positions in the respective schedules that correspond to respective times at which respective packets corresponding to the respective packet descriptors were received.

Embodiment 20: The method of embodiment 17, wherein using the respective scheduling information at the respective updated positions in the respective schedules to selectively transfer packet data to components of the network device comprises: using respective scheduling information in the respective schedules at the respective updated positions to control the time gate circuitry to selectively modify the packet descriptors to indicate selected packets are to be dropped.

Embodiment 21: The method of embodiment 17, wherein using the respective scheduling information at the respective updated positions in the respective schedules to selectively transfer packet data to components of the network device comprises: using respective scheduling information in the respective schedules at the respective updated positions to control the time gate circuitry to selectively modify the packet descriptors to indicate priority levels of selected packets are to be modified.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random-access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
a plurality of time gates configured to control transfer of packet data within the network device;
a memory configured to store schedules that indicate when time gates are to permit transfer of packet data; and
control circuitry configured to:
use a clock to repeatedly identify initial positions in the schedules, the initial positions i) corresponding to times when the schedules are accessed in a background procedure, and ii) having an accuracy that is insufficient for directly controlling the time gates,
use the identified initial positions to identify updated positions in the schedules that correspond to events when control of the time gates is needed, and
use scheduling information in the schedule at the updated positions to control time gates to selectively transfer packet data to components of the network device.

2. The network device of claim 1, wherein:
the memory is configured to store, for each of at least some gates among the plurality of gate circuits, a respective scheduling table corresponding to a respective schedule of when the time gate is to permit transfer of packet data; and
the control circuitry comprises:
first control circuitry configured to perform a background operation that uses the clock to repeatedly identify respective initial positions in respective scheduling tables, the respective initial positions having the accuracy that is insufficient for directly controlling the time gates, and
second control circuitry configured to control respective time gates using the respective scheduling tables, including:
in response to events when decisions regarding control of time gates are needed, and using the respective identified initial positions, identifying respective updated positions in respective scheduling tables that correspond to the events, and
using respective scheduling information in the respective scheduling tables at the respective updated positions to control time gates to selectively transfer packet data to components of the network device.

3. The network device of claim 1, further comprising:
a plurality of ports configured to communicatively couple to a plurality of communication links;
wherein each time gate within a set of time gates among the plurality of time gates is configured to control transfer of packet data to a corresponding port for transmission via a corresponding communication link, each time gate in the set corresponding to a respective priority level; and
wherein the memory is configured to store, for each of at least some time gates among the set of time gates, a respective scheduling table corresponding to a respective schedule of when the time gate is to permit transfer of packet data to the corresponding port.

4. The network device of claim 3, further comprising:
respective sets of multiple queues coupled to the plurality of ports, each set of multiple queues configured to store packet descriptors corresponding to packets to be transmitted via the respective port, wherein respective queues in each set correspond to respective priority levels;
wherein each time gate within the set of time gates is configured to control transfer of packet descriptor data from a respective queue to a memory controller to cause a packet corresponding to the packet descriptor to be sent to a port corresponding to the queue for transmission via the corresponding communication link.

5. The network device of claim 4, wherein:
the control circuitry is configured to, in response to packet descriptors being stored in respective queues, identify respective updated positions in respective scheduling tables that correspond to respective times at which the packet descriptors were stored in the respective queues.

6. The network device of claim 4, wherein:
the control circuitry is configured to, in response to packet descriptors arriving at respective time gates, identify respective updated positions in respective scheduling tables that correspond to respective times at which the packet descriptors arrived at the respective time gates.

7. The network device of claim 1, further comprising:
a plurality of ports configured to communicatively couple to a plurality of communication links; and
a packet processor configured to process packets received by the network device and to determine ports via which packets received by the network device are to be transmitted, the packet processor including time gate circuitry;
wherein the control circuitry is configured to:
in response to the time gate circuitry of the packet processor receiving packet descriptors, identify the respective updated positions in the schedules using the respective identified initial positions, and
use respective scheduling information in the schedules at the respective updated positions to control the time gate circuitry to selectively modify the packet descriptors.

8. The network device of claim 7, wherein the control circuitry is configured to:
in response to the time gate circuitry of the packet processor receiving packet descriptors, identify respective updated positions in the schedules that correspond to respective times at which the time gate circuitry received the respective packet descriptors.

9. The network device of claim 7, wherein the control circuitry is configured to:
in response to the time gate circuitry of the packet processor receiving packet descriptors, identify respective updated positions in the schedules that correspond to respective times at which respective packets corresponding to the respective packet descriptors were received.

10. The network device of claim 7, wherein the control circuitry is configured to:
use scheduling information in the schedules at the updated positions to control the time gate circuitry to selectively modify the packet descriptors to indicate selected packets are to be dropped.

11. The network device of claim 7, wherein the control circuitry is configured to:
use scheduling information in the schedules at the updated positions to control the time gate circuitry to selectively modify the packet descriptors to indicate priority levels of selected packets are to be modified.

12. A method for controlling information transfer within a network device, the method comprising:
storing schedules in a memory, the schedules indicating when time gates are to permit transfer of packet data;
repeatedly identifying, by control circuitry, initial positions in the schedules i) corresponding to times when the schedules are accessed in a background procedure, and ii) having an accuracy that is insufficient for directly controlling the time gates;
using, by the control circuitry, the identified initial positions to identify updated positions in the schedules that correspond to events when control of the time gates is needed; and
using, by the control circuitry, scheduling information at the updated positions in the schedules to selectively transfer packet data to components of the network device using the time gates.

13. The method of claim 12, wherein:
storing schedules in the memory comprises storing respective scheduling tables in the memory, the respective scheduling tables corresponding to respective schedules for when respective time gates are to permit transfer of packet data;
repeatedly identifying the initial positions in the schedules comprises performing, by first control circuitry, the background operation to use a clock to repeatedly identify respective initial positions in respective scheduling tables, the respective initial positions having accuracy that is insufficient directly controlling the time gates;
using the identified initial positions to identify updated positions in the schedules comprises: in response to events when time gate circuitry decisions are needed, identifying, by second control circuitry, respective updated positions in the respective scheduling tables that correspond to the events using the initial positions; and
using the scheduling information at the updated positions in the schedules to selectively transfer packet data comprises using, by the second control circuitry, respective scheduling information at the respective updated positions in the respective scheduling tables to selectively transfer packet data to components of the network device.

14. The method of claim 12, further comprising:
storing packet descriptors corresponding to packets in a plurality of queues corresponding to a plurality of time gates;
wherein using the scheduling information at the updated positions in the schedules to selectively transfer packet data comprises the control circuitry using scheduling information at the updated positions in the schedules to selectively transfer packet descriptors from the plurality of queues to a memory controller to cause packets corresponding to packet descriptors to be sent to one or more ports for transmission via the corresponding communication link.

15. The method of claim 14, wherein using the identified initial positions to identify updated positions in the schedules comprises:
in response to packet descriptors being stored in respective queues, identifying, by the control circuitry, respective updated positions in the respective schedules that correspond to respective times at which the packet descriptors were stored in the respective queues.

16. The method of claim 14, wherein using the identified initial positions to identify updated positions in the schedules comprises:
in response to packet descriptors arriving at respective time gates, identifying, by the control circuitry, respective updated positions in respective schedules that correspond to respective times at which the packet descriptors arrived at the respective time gates.

17. The method of claim 12, further comprising:
processing, by a packet processor, packets received by the network device to determine ports via which packets received by the network device are to be transmitted, the packet processor including time gate circuitry;
wherein using the identified initial positions to identify updated positions in the schedules comprises, in response to the time gate circuitry of the packet processor receiving packet descriptors, identifying respective updated positions in the respective schedules using respective identified initial positions; and
wherein using the scheduling information at the updated positions in the schedules to selectively transfer packet data comprises using respective scheduling information in the respective schedules at the respective updated positions to control the time gate circuitry to selectively modify the packet descriptors.

18. The method of claim 17, wherein identifying respective updated positions in the respective schedules that correspond to the events comprises:
in response to the time gate circuitry of the packet processor receiving packet descriptors, identifying respective updated positions in the respective schedules that correspond to respective times at which the time gate circuitry received the respective packet descriptors.

19. The method of claim 17, wherein identifying respective updated positions in the respective schedules that correspond to the events comprises:
in response to the time gate circuitry of the packet processor receiving packet descriptors, identifying respective updated positions in the respective schedules that correspond to respective times at which respective packets corresponding to the respective packet descriptors were received.

20. The method of claim 17, wherein using the respective scheduling information at the respective updated positions in the respective schedules to selectively transfer packet data to components of the network device comprises:
using respective scheduling information in the respective schedules at the respective updated positions to control the time gate circuitry to selectively modify the packet descriptors to indicate selected packets are to be dropped.

21. The method of claim 17, wherein using the respective scheduling information at the respective updated positions in the respective schedules to selectively transfer packet data to components of the network device comprises:
using respective scheduling information in the respective schedules at the respective updated positions to control the time gate circuitry to selectively modify the packet descriptors to indicate priority levels of selected packets are to be modified.

22. The network device of claim 1, wherein the control circuitry is configured to:
in response to each of at least some events among a plurality of events when decisions regarding control of time gates are needed, use a respective initial position in a respective scheduling table to identify a respective updated position in the respective scheduling table that corresponds to the event, the respective updated position being different than the respective initial position.

23. The method of claim 12, wherein using the identified initial positions to identify updated positions in the schedules comprises:
for each of at least some events among a plurality of events when decisions regarding control of time gates are needed, using a respective initial position in a respective scheduling table to identify a respective updated position in the respective scheduling table that corresponds to the event, the respective updated position being different than the respective initial position.

* * * * *